United States Patent [19]

Harvey

[11] 4,309,089
[45] Jan. 5, 1982

[54] EXPOSURE INDICATING APPARATUS RESPONSIVE TO FILM EXPOSURE LATITUDE

[75] Inventor: Donald M. Harvey, Webster, N.Y.

[73] Assignee: Eastman Kodak Company, Rochester, N.Y.

[21] Appl. No.: 66,122

[22] Filed: Aug. 13, 1979

Related U.S. Application Data

[63] Continuation-in-part of Ser. No. 862,263, Dec. 20, 1977, abandoned.

[51] Int. Cl.³ ............................................. G03B 7/097
[52] U.S. Cl. .................................. 354/23 D; 354/37; 354/58; 354/289
[58] Field of Search ................... 354/23 D, 21, 28, 37, 354/41, 58, 60 R, 60 E, 60 L, 289; 250/214 P

[56] References Cited

U.S. PATENT DOCUMENTS

| | | | |
|---|---|---|---|
| 3,505,937 | 4/1970 | Albedyll et al. | 354/41 |
| 3,852,777 | 12/1974 | Lieser | 354/21 |
| 3,950,767 | 4/1976 | Matsui | 354/41 |
| 4,064,515 | 12/1977 | Mashimo | 354/23 D |
| 4,090,207 | 5/1978 | Mashimo | 354/23 D |

*Primary Examiner*—L. T. Hix
*Assistant Examiner*—S. D. Schreyer
*Attorney, Agent, or Firm*—D. I. Hague

[57] ABSTRACT

A photographic camera includes exposure control apparatus for determining automatically if the camera is adjusted to achieve a suitable exposure. This determination is made taking into account the exposure latitude of film in the camera. The control apparatus includes film data-retrieval apparatus for receiving both film speed and film exposure latitude data. A light-level sensing circuit determines scene brightness, and diaphragm and shutter control mechanisms provide data relating to the aperture size and shutter speed, respectively, at which the camera is set. A microprocessor computes an exposure value that is based on scene brightness and film speed. The microprocessor then uses the computed exposure value to compute a range of acceptable exposure values corresponding to the film exposure latitude. The microprocessor also computes an exposure value that is anticipated based on the aperture size and shutter speed at which the camera is set. The microprocessor compares this anticipated exposure value to the computed exposure value range and provides for activation of an indicator to signal a camera operator as to whether or not the camera is adjusted so as to achieve a suitable exposure.

7 Claims, 5 Drawing Figures

EXPOSURE INDICATING APPARATUS RESPONSIVE TO FILM EXPOSURE LATITUDE

CROSS-REFERENCE TO RELATED APPLICATIONS

This application is a continuation-in-part application of U.S. Ser. No. 862,263, filed on Dec. 20, 1977 in the name of Donald M. Harvey, now abandoned.

BACKGROUND OF THE INVENTION

1. Field of the Invention

The invention relates to camera apparatus for determining if the camera is adjusted to achieve a suitable exposure for prevailing scene light conditions. More particularly, the invention provides exposure control apparatus which takes into account the exposure latitude of the film being utilized in the camera in determining whether or not the camera is adjusted to achieve a suitable exposure.

2. Description Relative to the Prior Art

Cameras are known in the art having exposure control circuits that deflect a movable member such as a needle in relation to the amount of light present and the light sensitivity, frequently called speed, of the film being used. The light is sensed by a photoconductive device, and the film speed value is typically provided by manual adjustment of a multi-position switch. The camera further includes a reference mark mechanically coupled to the aperture and/or shutter control mechanism, the mark being located in proximity to the needle. The camera operator views the deflecting needle and the reference mark and manually adjusts the aperture and/or shutter mechanism until the needle and reference mark coincide. With such an adjustment, an exposure may be obtained that produces a quality photograph.

There are other cameras that provide for proper camera adjustment by use of a balancing circuit, such as a Wheatstone bridge, one arm of the bridge including a photocell, and a second or reference arm including electrical elements having values which are functionally related to the shutter speed and/or aperture size at which the camera is adjusted. When a balanced electrical condition is achieved between the arms, the camera is considered to be properly adjusted.

A disadvantage of these kinds of cameras is that only one particular exposure value is used to determine if they are properly adjusted.

U.S. Pat. Nos. 3,678,827 and 3,852,777, both of which are assigned to the assignee of the present invention, disclose camera apparatus which control low-light signal mechanisms in accordance with the underexposure latitude of films in the cameras. The '777 patent discloses an automatic exposure control apparatus for a camera that takes into account underexposure latitude to determine if a suitable exposure may be made in dim light conditions without increasing the exposure time beyond a predetermined unacceptable limit. When a light level is detected that requires an excessively long exposure time to achieve an "optimum" exposure level, but is within the limits of the underexposure latitude of the film, the exposure control causes an exposure to be effected that is less than "optimum" without increasing exposure time beyond the predetermined limit. In doing so, a low-light indicator is inhibited when underexposure latitude is taken into account.

The apparatus disclosed in both the '827 and '777 patents permits the low-light capability of the cameras to be expanded. However, such apparatus does not utilize overexposure latitude of photographic films to expand a camera's apparent usefulness for making acceptable exposures of very bright scenes.

With many negative films, acceptable photographs may be achieved even though the film is overexposed or underexposed from what might be considered an "optimum" exposure. Some films of this type, for example, may be overexposed up to the equivalent of three exposure values, or underexposed the equivalent of two exposure values, yet an acceptable photograph will be produced. Using these films, one camera setting will suffice for many normally encountered scene conditions. For example, a camera using a particular negative film may be set for an exposure appropriate for overcast or open shade conditions and still acceptably accommodate exposure conditions ranging from bright indoor daylight scenes to summer sunlight scenes. In effect, these exists, instead of a discrete "optimum" exposure, a "window", constituting a range of exposures, appropriate for the film being utilized, that produces satisfactory photographs. As long as the camera is adjusted to produce an exposure within this "window", the camera operator may make photographs without concern for certain departures from the "optimum" exposure. Therefore, it is apparent that the prior art camera apparatus discussed above for indicating the appropriateness of camera settings are unnecessarily restricted.

SUMMARY OF THE INVENTION

The present invention provides apparatus for determining whether a camera is adjusted for prevailing scene light to achieve an exposure that is within film exposure latitude including both underexposure latitude and overexposure latitude.

The invention and its objects and advantages, will become more apparent in the detailed description of a preferred embodiment presented below.

BRIEF DESCRIPTION OF THE DRAWINGS

In the detailed description of a preferred embodiment of the invention presented below, reference is made to the accompanying drawings, in which.

DESCRIPTION OF A PREFERRED EMBODIMENT

Because photographic cameras and film cartridges are well known, the present description will be directed in particular to elements forming part of, or cooperating more directly with, apparatus in accordance with the present invention. It is to be understood that camera elements and cartridge elements not specifically shown or described may take various forms well known to those having skill in the art.

Figure 1:
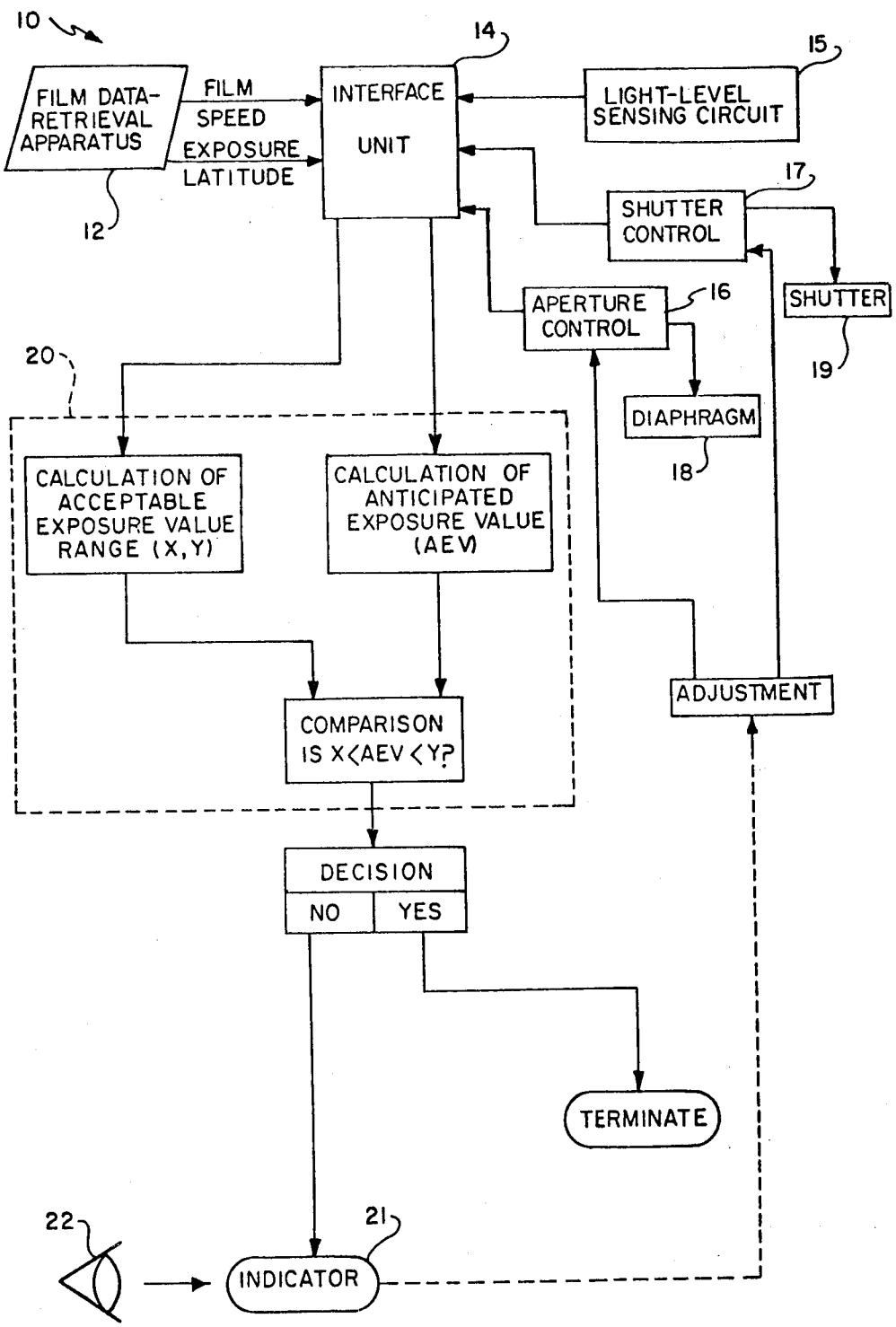
FIG. 1 illustrates the present invention in block diagram form.

FIG. 1 is a block diagram, denoted generally 10, for illustrating the present invention. Film data-retrival apparatus 12, described in detail hereinafter, provides data corresponding to the film speed and exposure latitude of the film being used and provides this data to an interface unit 14.

The term "film speed" as used herein means the sensitivity of a given film to light, and is related to an exposure which produces a given film density. This sensitivity may be indicated by an American National Standards Institute (ANSI) number.

The term "film exposure latitude" as used herein means a range of exposure values within which a given film will produce a negative or positive of satisfactory quality. Film exposure latitude may be represented by an upper exposure value number and a lower exposure value number.

The term "exposure value" (EV) as used herein means the amount of light reaching the film. Exposure values are represented by a scale of successive whole numbers, each number being equivalent to half the light of the next lower number, and twice the light of the next higher number. Any given exposure value covers a range of aperture shutter-speed combinations that yield the same exposure. For instance, the exposure value of 13 gives a range of aperture/shutter-speed combinations of f/4 at 1/500 second through f/32 at ⅛ second. A scale from 2 to 18 is sufficient for all normal photographic purposes since it represents exposures from 1 second at f/2 to 1/500 second at f/200, a range of over 1:60,000. For additional information pertaining to exposure values, reference is made to *The Focal Encyclopedia of Photography*, Revised Desk Edition, published by McGraw-Hill, 1969.

A light-level sensing circuit 15 serves to provide data to interface unit 14 relating to the brightness of the scene to be photographed. An aperture control mechanism 16 and a shutter control mechanism 17 provide data to interface unit 14 regarding the aperture size and shutter speed, respectively, at which the camera is set. Mechanism 16 establishes aperture size by regulating an adjustable diaphragm 18, and mechanism 17 controls shutter speed by adjusting a shutter 19.

Diaphragm 18 and shutter 19 may be any of a number of well-known mechanisms of the type which regulate the amount of light and the duration of light, respectively, that impinges on a film. For example, shutter 19 may be of the type that is disclosed in U.S. Pat. No. 3,906,525 issued to H. Ettischer on Sept. 16, 1975 and assigned to the assignee of the present invention. Such a shutter includes a single blade movable for sequentially covering and uncovering an exposure aperture. A restraining member, responsive to a manually settable shutter-speed setting member, is adjustably located in the path of the shutter for regulating the speed at which the shutter blade moves across the exposure aperture to thereby control the duration of an exposure interval. Interface 14 transfers this aperture size and shutter speed information along with the scene brightness data, and film speed and exposure latitude data, to a processing unit, denoted generallly 20, which is preferably a microprocessor.

Microprocessor 20 computes an exposure value based on scene brightness and film speed. The microprocessor then uses such computed exposure value to compute a range of exposure values corresponding to the film exposure latitude; such range has one boundary defined by a lower acceptable exposure value, denoted X, and a second boundary defined by an upper acceptable exposure value, denoted Y.

Microprocessor 20 further computes an anticipated exposure value (AEV) based on camera aperture size and shutter speed, and determines whether such AEV is within the computed exposure value range, in other words, whether an exposure will be effected that will produce an image of satisfactory quality. To accomplish this, AEV is compared to the range established by exposure values X and Y. If AEV is outside this range, an indicator 21 is activated to convey this fact to the camera operator (indicated by numeral 22). This information signals the operator to adjust the camera to produce a new AEV to attempt to bring the latter within the boundary exposures X and Y. If this occurs, indicator 21 is de-activated to signal that the camera is set to effect a proper exposure.

Figure 2:
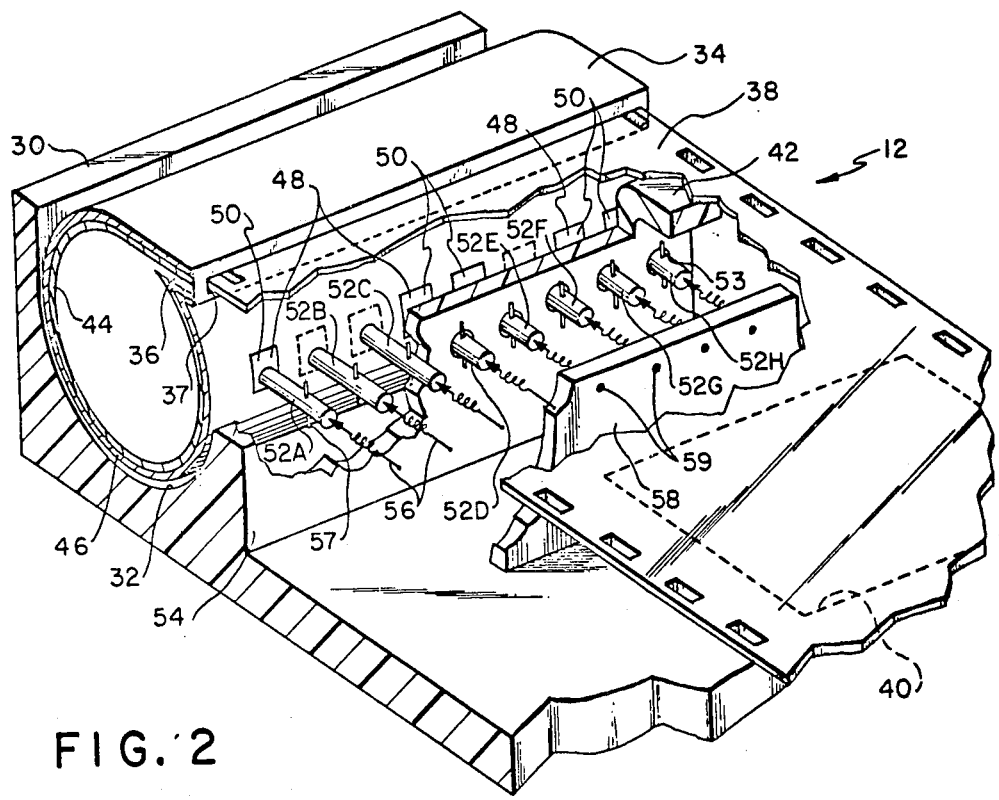
FIG. 2 illustrates apparatus by which a camera may sense automatically film speed and film exposure latitude information for the film being utilized.

Referring now to FIG. 2, there is shown an arrangement constituting film data-retrieval apparatus 12, shown generally in FIG. 1, for receiving film speed and film exposure latitude information automatically. A portion of a camera body, denoted 30, defines an arcuate film chamber 32 in which there is placed a cylindrical film cartridge 34. An extension 36 extends tangentially from the top surface of the cartridge 34, as viewed in FIG. 2, and includes at its open end an elongate rectangular slot 37 through which film 38 is extracted, by means not shown, from the cartridge. Film 38 is located in a film exposure plane 40 for exposure to impinging scene light by means of a film biasing plate 42, only a portion of which is shown in FIG. 2.

Cartridge 34 includes an inner conductive sheathing 44 surrounded by an insulating overcoat 46. Formed across the width of cartridge 34 in the overcoat 46 are a series of spaced apertures 48, which expose the underlying conductive sheathing 44 to form a series of metallic contacts 50. The pattern formed by contacts 50 constitutes a binary representation of film speed and film exposure latitude, as described in detail hereinafter.

Other forms of the contacts 50 may be utilized such as, for example, small metallic contact blocks which may be secured directly onto the overcoat 46 by means of a suitable adhesive. It should be similarly apparent that the invention is not dependent on the particular form of cartridge 34 and will be equally useful with other forms, for example, flat-pack cartridges, or the well known 126 and 110 size cartridges or the like.

Film data-retrieval apparatus 12 includes a series of spaced electrical contact pins 52 (individually numbered 52A through 52H) which extend through apertures 53 formed from an interior camera wall 54, which defines a portion of film chamber 32. A series of biasing elements 56, for example, small coil springs, are lodged between a second interior wall 58 and the pins 52, as shown, and are provided to force the pins into secure contact with cartridge 34. The pins 52 are spaced relative to one another so that each will be aligned with a possible corresponding contact 50 on cartridge 34. A stop member 57 is attached to each pin 52 to retain the pins in their respective apertures 53 against the bias force of springs 56. To maintain springs 56 aligned with their respective pins 52, the springs are embedded in wall 58 as shown by the numeral 59.

Figure 3:
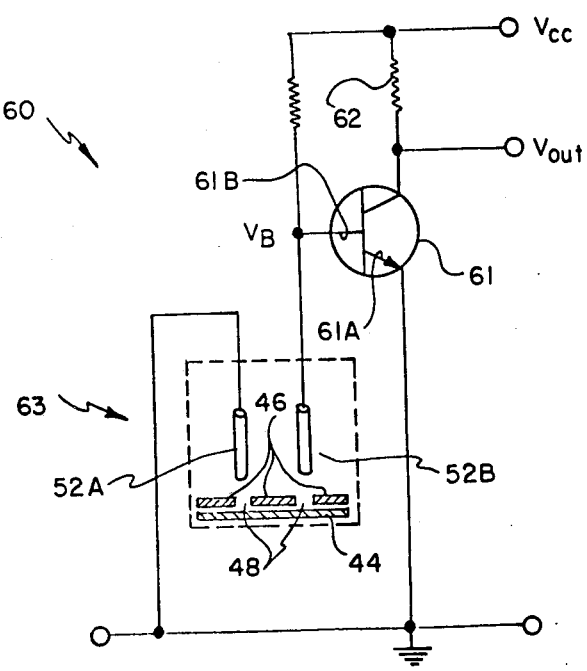
FIG. 3 is a schematic diagram of a binary sensing circuit for use with the apparatus of FIG. 2.

Referring now to FIG. 3, there is shown electronic circuitry, denoted generally 60, for detecting the presence of a contact 50, shown by solid line in FIG. 2. Circuit 60 serves to sense a change between two stable states of electrical conduction and operates as an inverter circuit, as follows: When its base electrode voltage, $V_B$, is at a low level, e.g. state 0, transistor 61 does not conduct, and so no current flows from the supply voltage $V_{cc}$ through resistor 62 to electrical ground. As a result there is no voltage drop across resistor 62, and the output voltage, $V_{out}$, is at a high level or state 1 which is essentially that of the supply voltage $V_{cc}$. When $V_B$ is at a high level, transistor 61 conducts. When a collector current flows, there is a substantial voltage drop across resistor 62. As a result, $V_{out}$ drops almost to ground potential, or state 0. In other words, when $V_B$ is low, $V_{out}$ is high, and when $V_B$ is high, $V_{out}$ is low.

To sense the presence of a contact 50, circuit 60 includes a double pole switch mechanism 63 connected between the emitter electrode 61A and base electrode 61B of the transistor. One pole of switch 63 is formed from one of the pins 52, specifically pin 52A, which is connected through electrical ground to emitter electrode 61A. The other pole is formed from a selected one of the other pins 52, pin 52B for this example, which is connected to base electrode 61B. Conductive sheath 44 is the element by which the two poles of the switch 63 may be electrically connected. If apertures 48 are formed in the overcoat 46 in alignment with pins 52A and 52B, such pins mutually contact conductive sheath 44 to form a closed circuit, thereby effectively short circuiting the base-emitter junction of transistor 61. In the absence of an aperture 48 under pin 52B, switch 63 remains open since pins 52A, 52B will not be electrically connected by means of sheath 44.

When voltage is applied to circuit 60, it operates as follows: If switch 63 is open indicating the absence of a contact 50 under pin 52B, transistor 61 conducts and $V_{out}$ is at a low level, e.g. state 0. If, however, switch 63 is closed, indicating a contact 50 is present under pin 52B (and, of course, pin 52A), transistor 61 does not conduct. In that condition, $V_{out}$ is at a state 1.

It will now be obvious to those skilled in the art that a similar circuit 60 would be provided for each of the pins 52 (other than the grounding pin 52A) to determine the presence or absence of a respective contact 50 aligned with a respective pin 52B through 52H. In each circuit, pin 52A would serve the common purpose of a grounding connection.

Film speed, and film exposure latitude as represented by an overexposure value and an underexposure value, are encoded in binary form on cartridge 34. By providing that each contact 50 represents the binary equivalent of "1" or "0" ("1" when the contact 50 or aperture 48 is present and "0" when the contact or aperture is absent), the contacts are grouped together to form a binary word having a magnitude which represents film speed, and film exposure latitude. In the case of representing any of 7 film speeds, three contacts 50 are required. For example, the following selection of film speeds may be represented in binary form:

| Film Speed (ANSI) | Contacts "bits" |
| --- | --- |
| (uncoded cartridge) | 000 |
| 25 | 001 |
| 64 | 010 |
| 80 | 011 |
| 100 | 100 |
| 125 | 101 |
| 160 | 110 |
| 400 | 111 |

If, for example, the upper exposure latitude were to be represented by any of four possible amounts of overexposure, two additional contacts 50 would be required. For example:

| Upper Exposure Latitude (Number of exposure values) | Contact "bits" |
| --- | --- |
| ½ | 00 |
| 1 | 01 |
| 2 | 10 |
| 3 | 11 |

In a similar manner two additional contacts could be devoted for any of four possible amounts of underexposure to represent the lower or underexposure latitude.

It will be apparent that other formats are equally useful for encoding film information. For example, a "combination code" is disclosed in a co-pending U.S. patent application, Ser. No. 905,689, filed May 15, 1978, U.S. Pat. No. 4,173,401, by the same inventor and assigned to the assignee of the present application, the disclosure of which is incorporated herein by reference. Such a "combination code" represents a particular combination of a variety of film characteristics including film speed.

Figure 4:
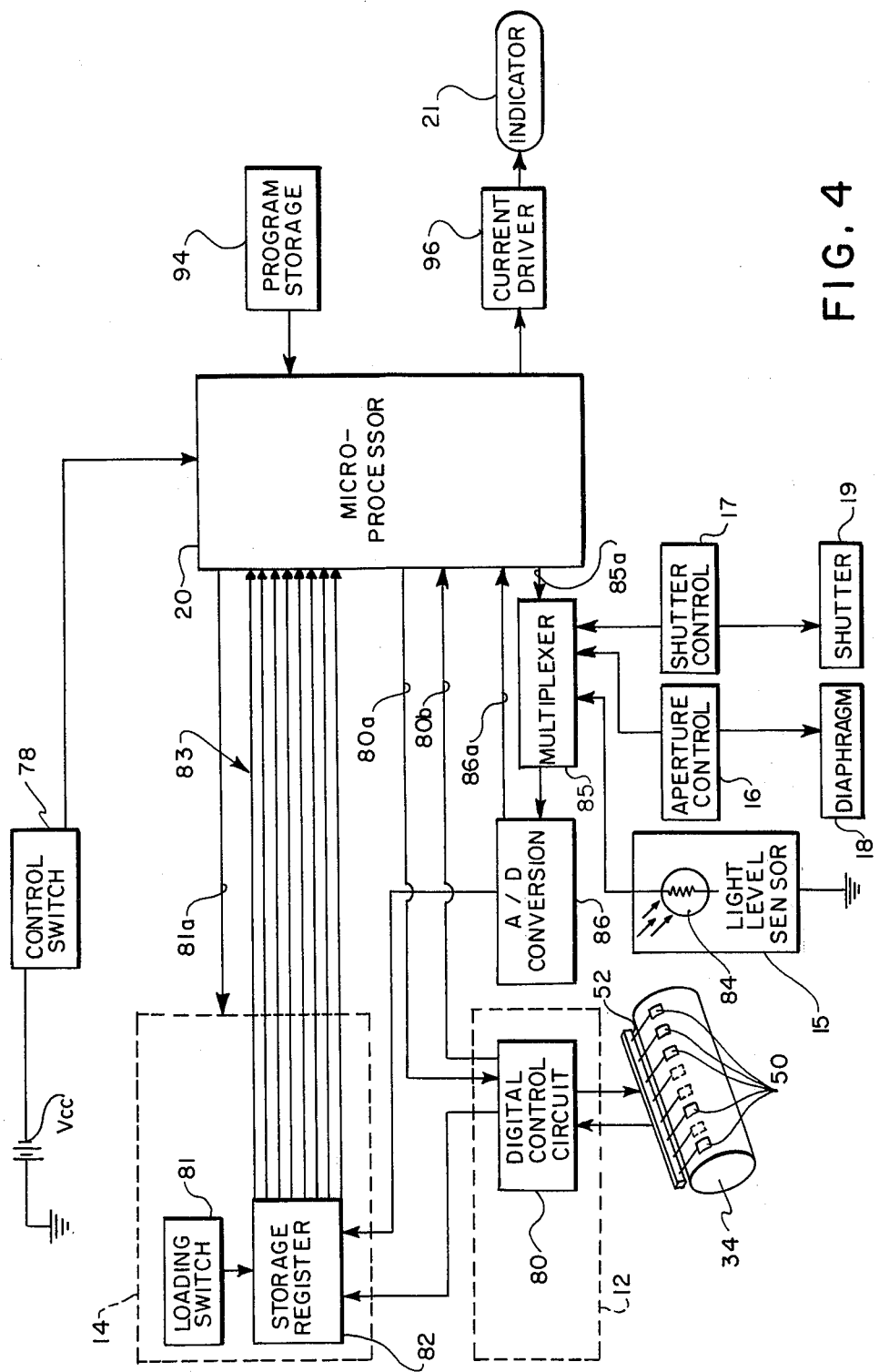
FIG. 4 is a block diagram of a presently preferred embodiment of apparatus constituting the present invention.

Referring now to FIG. 4, there is illustrated camera apparatus which, in accordance with the teachings of this invention, utilizes film exposure latitude in the determination of whether or not the camera is set to achieve a quality photograph for prevailing light conditions. Such apparatus includes an 8-bit microprocessor which performs functions identical to that of the processing unit 20 in the simplified block diagram of FIG. 1. Programmable microprocessors are commercially available devices. An example of a microprocessor which may be suitable for use with the present invention is the Model 8080 microcomputer manufactured by Intel Corporation of Santa Clara, California. Further, published literature describing microprocessors and providing the instructions and methods of programming them is widely available. Examples of the published literature are *Microprocessors and Microcomputers*, by B. Soucek, (Wiley, 1976), and *Minicomputers for Engineers and Scientists*, Gravino Korn (1973), the disclosures of which are incorporated herein by reference.

Microprocessor 20 is effectively controlled by a manually operable input control switch 78 connected to the camera power source, for example, a battery. In a preferred embodiment, control switch 78 is actuated in a response to initial movement of an operator-controlled shutter actuation button (not shown), such initial movement occuring prior to shutter 19 being opened to commence an exposure interval. Actuation of switch 78 commences a series of operations performed by microprocessor 20 which are described in detail hereinbelow.

Film data-retrieval apparatus 12, discussed previously and illustrated in block form in FIG. 1, includes a digital control circuit 80 for applying both voltage signals to electrical contact pins 52, and for receiving signals relating to the information encoded on cartridge 34. For this purpose, circuit 80 includes a plurality of the modified inverter circuits 60 shown schematically in FIG. 3 and previously discussed. A binary word is generated by circuit 80 in accordance with the pattern of contacts 50 under the respective pins 52. Such word represents the film speed and exposure latitude of the film in cartridge 34, and is transferred to interface unit 14 by circuit 80.

Interface unit 14, discussed previously and illustrated in block form in FIG. 1, includes a loading switch 81 and a data storage register 82 which is settable in accordance with received input data provided by film data retrieval apparatus 12. Switch 81 serves as a gate for transferring digital signals temporarily loaded in storage register 82, along data transfer lines 83 to a storage location (not shown) in the microprocessor 20.

Data produced by light-level sensing circuit 15 and the aperture control and shutter control mechanisms 16 and 17, respectively, are in the form of electrical signals, the amplitudes of which are proportional to the respective parameters to which the signals relate. Camera apparatus for producing electrical signals relating to camera exposure information are well known in the photographic art. For example, the data provided by light-level sensing circuit 15 is formed by means of a photoresistive element 84. As is known in the art, such an element has an electrical resistance that is inversely proportional to the intensity of impinging light. When such element is in series with a resistor having a fixed predetermined value, the combination of the photoresistor and resistor forms a voltage divider circuit. Accordingly, the voltage signal produced across the fixed valued resistor has an amplitude which is proportional to scene light intensity or brightness.

The electrical signals relating to aperture size and shutter speed may be produced by means of variable resistors, included within voltage divider circuits (not shown) associated with aperture control and shutter control mechanisms 16 and 17, respectively. For example, adjustable diaphragm 18 may provide for varying a camera taking lens aperture between f-stop settings of approximately f/8 to f/22, and a shutter speed setting member may provide for shutter speeds ranging from 1/30 second to about 1/300 second or less. The aforementioned variable resistors have electrical resistances proportional to the aperture size and shutter open time. Voltage signals are produced across such resistors that have amplitudes related to these resistances. Accordingly, electrical signals are produced representing exposure information such as shutter speed and aperture size.

Reference is also made to U.S. Pat. No. 4,048,644 which discloses a block diagram representing an electric circuit which produces electrical signals relating to scene brightness, and aperture size and shutter speed.

These electrical signals are applied to an analog multiplexer 85 which at the appropriate time, selected by the microprocessor 20 provides multiplexed output signals to an analog to digital (A/D) converter 86. The converter 86 is arranged to convert the analog signals relating to scene brightness produced by circuit 15, and aperture size and shutter speed data produced by mechanisms 16 and 17, respectively, to digital signals. Converter 86 then serves to transfer such digital signals to storage register 82 of interface unit 14.

A read-only memory program storage unit 94 is connected to microprocessor 20 for supplying microprocessor program instructions to permit the microprocessor to determine whether or not the camera is adjusted for prevailing light conditions so as to effect a proper or suitable exposure. A computer program for providing such instructions and for use with apparatus constituting the invention is illustrated in abbreviated form by the program flow chart of FIG. 5.

Figure 5:
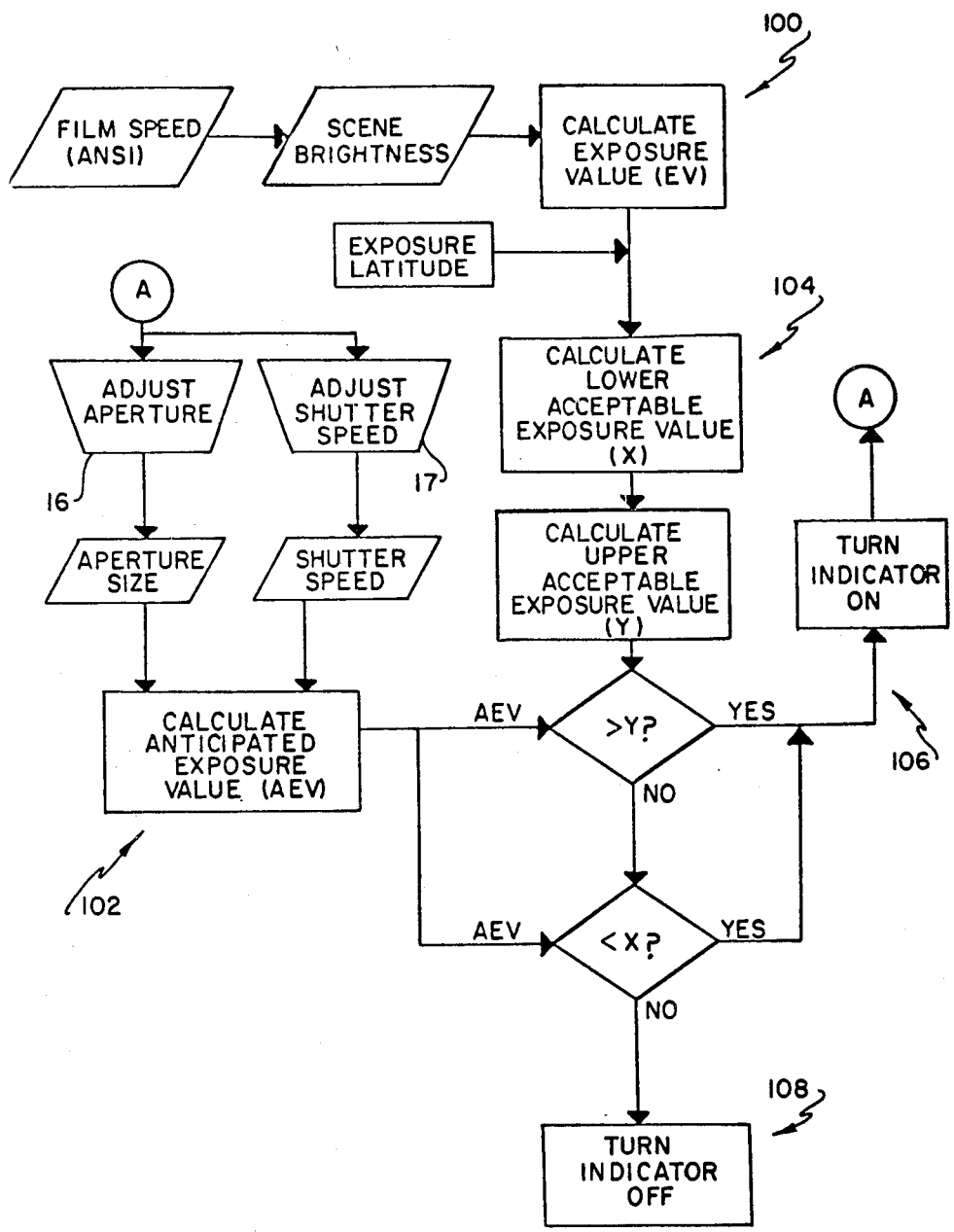
FIG. 5 is a simplified flow chart of a computer program for use with the apparatus of FIG. 4.

The flow chart of FIG. 5 is divided into five primary sections, denoted with even numbers 100 through 108. Section 100 of the program uses data relating to film speed provided by retrieval apparatus 12, and scene brightness produced by circuit 15 to determine an exposure value (EV) for the film employed.

Program section 102 produces an anticipated exposure value (AEV). AEV represents a discrete exposure value which would be produced utilizing an aperture size and shutter speed as indicated by mechanisms 16 and 17, respectively.

Program section 104 constitutes program means that uses the film exposure latitude data provided by film data-retrieval apparatus 12 and the EV produced by program section 100 to compute an acceptable upper exposure value and an acceptable lower exposure value for the film employed. Program section 104 further compares the AEV produced by program section 102, to the calculated acceptable upper and acceptable lower exposure values to determine if such AEV is within the exposure latitude of the film. If AEV lies outside the range defined by such upper and lower exposure values, indicator 21, shown in FIGS. 1 and 4 is activated or energized by means of a command from program section 106. Accordingly, a signal is provided to a camera operator, such as by a lamp in the camera viewfinder (not shown), that the camera exposure parameters need to be varied in order to obtain an exposure which is within the film exposure latitude. In the illustrated example, this would be done by adjusting the size of the lens aperture, or adjusting shutter speed, or both.

If, on the other hand, it were determined in program section 104 that the AEV is between the upper and lower limits of the computed acceptable exposure range, program section 108 is employed to issue an appropriate command to indicator 21 so that the camera operator is apprised that the camera is adjusted for an acceptable exposure for the prevailing scene light conditions and the film being employed.

In operation, a film cartridge 34 having film information including film speed and exposure latitude coded in binary form is inserted into film-receiving chamber 32 of the camera. Upon initial movement of a camera shutter release button (not shown) and prior to shutter 19 being opened, control switch 78 is actuated to apply electrical power from $V_{cc}$, to power the circuitry shown in FIG. 4. Upon application of electrical power, the following sequence of operations takes place. Microprocessor 20 sends a data request signal on lead 80a to the digital control circuit 80. Digital control circuit 80 applies voltage signals to each of pins 52B through 52H. If an associated contact 50 is absent, associated switch mechanism 63 is in its open position, and the output, $V_{out}$, is a low-level voltage corresponding to state 0, i.e. a binary 0. Of course, if contact 50 is present, its associated mechanism 63 is closed and the output $V_{out}$ is a high-level signal representative of a state 1 or binary 1. After each pin 52 receives its input voltage signal, a binary signal is produced representing the film speed and the film exposure latitude data coded on cartridge 34. Digital control circuit 80 serves to transfer this binary signal to storage register 82. After completion of this signal transfer process, a data transfer signal is sent to the microprocessor 20 on lead 80b. This data transfer signal causes the microprocessor 20 in the appropriate sequence in its program to execute a data transfer request on lead 81a. Upon execution of the proper instruction by microprocessor 20 as provided by program storage 94, loading switch 81 delivers this binary signal from the storage register 82 along data lines 83 to registers (not shown) in the microprocessor 20, where the data is temporarily stored for subsequent processing.

In order to process signals produced by light-level sensing circuit 15, aperture control mechanism 16, and shutter control mechanism 17, microprocessor 20 in the appropriate sequence in its program, produces multiplexer channel address select signals on lead 85a to sequentially switch inputs to A/D converter 86. Thereafter, A/D converter 86 converts input analog data into digital words. Upon completion of each such A/D conversion process, converter 86 transmits a conversion completion signal to microprocessor 20 on lead 86a. This completion signal causes microprocessor 20 in the appropriate sequence in its program to execute a data transfer request on lead 81a to accept data from converter 86 on data transfer lines 83 through register 82.

With data relating to the film being utilized and camera exposure data loaded into microprocessor 20, an arithmetic logic unit (not shown) located in the microprocessor undertakes the sequence of logic mentioned previously in connection with the program flow chart of FIG. 5.

EV and AEV may be expressed by the following equations:

$$AEV = \log_2 A^2/T \qquad (1)$$

$$EV = \log_2 (LS/K) \qquad (2)$$

where
A = f-number of camera lens
T = exposure-time interval (seconds)
S = arithmetic film speed
L = scene luminance (foot lamberts)
K = exposure level constant The constant K may be expressed as:
K = 3.33 ± 0.5 for 35 mm film, 16 mm movie film and larger sizes.
K = 4.2 ± 0.6 for 8 mm and Super 8 films and 110 size films.

For a further detailed discussion of the exposure level constant K, reference is made to *Photometry and Radiometry for Engineers*, by Allen Stimson, published by John Wiley & Sons.

The arithmetic logic unit computes the range of exposure values acceptable for the film. Firstly, equation (2) is solved for EV, using the scene luminance and film speed data, to produce a signal representing EV. Then, using the film latitude data, signals are computed representing the range of acceptable exposure values. This range is represented at one end by the aforementioned upper acceptable exposure value Y, which corresponds to the sum of EV and the film overexposure latitude, and at the other end by lower acceptable exposure value X, which is equal to EV minus the film underexposure latitude.

This exposure value range permits a determination of whether the lens f-number and shutter speed at which the camera is adjusted is appropriate for the scene luminance and film employed. This determination is done by solving equation (1) to produce a signal representing AEV. The signal representing AEV is compared to the signal representing the range of acceptable exposure values. If AEV is found to be outside the computed range of acceptable exposure values, a control signal is transmitted from microprocessor 20 to activate a current driver 96. With current driver 96 activated, indicator 21 is energized to provide a warning signal to the camera operator. This signal is an indication to the operator to adjust either diaphragm 18 by means of diaphragm control 16, or to adjust the shutter 19 by means of shutter control 17. When control switch 78 is again actuated, the entire sequence resumes. Such sequence continues until AEV is within the range defined by the upper and lower scene exposure values. At that time, indicator 21 is de-energized.

The teachings of this invention may also be used to employ an arrangement for indicating whether the range of capabilities of the camera would permit the camera to be set or adjusted to achieve a proper exposure for the film utilized. Such an arrangement proceeds from a recognition that a variety of combinations of shutter speeds and aperture sizes may be employed to produce a range of exposure values. Such a range would be bounded at one end by an exposure value for the combination of the fastest shutter speed and smallest lens aperture, and would be bounded at the other end by an exposure value for the combination of the slowest shutter speed and largest lens aperture. The former constitutes a high exposure value and relates to the least amount of light passed through the camera lens to the film, and the latter is a low exposure value and relates to the greatest amount of light passed through. With information relating to the least and the greatest amount of light that the camera exposure control is capable of passing through, a determination may be made, which takes into account film exposure latitude, as to whether or not the subject brightness is such so as to permit the exposure control apparatus to be adjusted to produce a proper exposure.

A camera exposure value range ($EVR_c$) may be expressed as follows:

$$EVR_c = \log_2 \frac{A^2_{MAX}}{T_{MIN}} - \log_2 \frac{A^2_{MIN}}{T_{MAX}} \qquad (3)$$

For instance, a camera having a shutter-speed range from 1/30 to 1/500 second and a range of apertures from f/2.8 to f/16 can provide a range of exposure values from 8 to 17.

An exposure value range for the camera and film combination ($EVR_{c,f}$) may be expressed as the sum of the exposure value range for the camera and the exposure latitude of the film employed:

$$EVR_{c,f} = EVR_c + \text{film exposure latitude} \qquad (4)$$

To determine if the camera is adjustable to achieve a proper exposure requires that an exposure value as provided by equation (2), falls within the exposure value range for the camera and film, as provided by equation (4). If this is the case, the range of capabilities of the camera would be adequate to produce a proper exposure of the scene. Of course, if the exposure value provided by equation (2) falls within $EVR_{c,f}$, it would be necessary to determine, as described in detail hereinbefore, whether or not the particular combination of aperture size and shutter speed at which the camera is adjusted produces an AEV that is within the range of acceptable film exposure values.

Two indicators 21, may be provided, one indicator would be to signal that AEV is higher than the upper acceptable exposure value, the second indicator would be for signaling that AEV is less than the lower acceptable exposure value. Two indicators would serve to remove any ambiguity from the camera operator as to which direction either the lens aperture size or shutter speed would have to be changed in order to bring the computed AEV within the computed exposure value range of the film employed.

Whether one or two indicators 21 are provided, the latter preferably would be located in the camera viewfinder. This location ensures that the photographer will have easy access to any idicator signal without having to move the camera out of a picture-taking position.

Although the invention has been described in connection with the sensing of contacts on a film cartridge, this description has only been by way of a preferred example. Instead of encoding the film exposure latitude and film speed on the cartridge, the information may be provided to the microprocessor in other manners, e.g. by manually adjustable dials on the body of the camera.

The invention has been described in detail with particular reference to a preferred embodiment thereof, but it will be understood that variations and modifications can be effected within the spirit and scope of the invention.

I claim:

1. In a camera having means for setting an exposure control mechanism, and means for indicating the suitability of the exposure control setting to effect a proper film exposure, the improvement comprising:
    a. means settable in accordance with the exposure latitude, including an overexposure latitude and an underexposure latitude, of the film received in the camera; and
    b. digital electronic computer means receiving input from said exposure control mechanism setting means and input from said film exposure latitude settable means for causing said indicating means to indicate the adequacy of the exposure control mechanism setting to effect an exposure which is within said film exposure latitude.

2. In a camera having means for adjusting an exposure control mechanism to regulate the amount of light which impinges on a photographic film, and means for indicating the adequacy of the adjustment of said exposure control mechanism to effect a proper exposure of film received in the camera, the improvement comprising:
    a. register means settable in accordance with a received film's speed and exposure latitude including an over-exposure latitude and an underexposure latitude; and
    b. digital electronic computer means receiving input from said exposure control mechanism adjusting means and input from said register means for causing said indicating means to indicate the adequacy of the adjustment of said exposure control apparatus to effect an exposure which is within said film exposure latitude.

3. In a camera having means for adjusting an exposure control mechanism to regulate the amount of light which impinges on a photographic film, and means for indicating the suitability of the adjustment of said exposure control mechanism to effect a proper exposure of film received in the camera, the improvement comprising:
    a. means settable in accordance with a received film's speed and exposure latitude including (1) overexposure latitude relating to a maximum acceptable exposure, and (2) underexposure latitude relating to a minimum acceptable exposure; and
    b. digital electronic computer means receiving input from said exposure control mechanism adjusting means and input from said settable means for causing said indicating means to indicate whether the adjustment of said exposure control apparatus will provide a film exposure within a range bounded by said maximum acceptable exposure and said minimum acceptable exposure.

4. In a camera having means for setting exposure control mechanism for regulating the amount of scene light which impinges on a photographic film, and means for indicating the adequacy of said exposure control mechanism to effect a proper exposure of film received in the camera, the improvement comprising:
    a. means settable in accordance with a received film's speed and exposure latitude including overexposure latitude and underexposure latitude; and
    b. digital electronic computer means deriving input from said exposure control mechanism setting means, and said film exposure latitude settable means for causing said indicating means to indicate whether the light regulating capability of said exposure control apparatus is adequate for a particular scene brightness to achieve a film exposure which is within said film exposure latitude.

5. In a camera having means for sensing the brightness of a scene, an aperture control mechanism and a shutter control mechanism for regulating the amount of light reflected from a scene being photographed that reaches the film exposure plane of said camera, and means for indicating the suitability of said exposure control apparatus to effect a proper exposure of film received in the camera, the improvement comprising:
    a. means settable in accordance with a received film's light sensitivity and exposure latitude including overexposure latitude and underexposure latitude;
    b. digital electronic computer means receiving input derived from said aperture control mechanism, said shutter control mechanism, said sensing means and said settable means for computing for a particular scene brightness (1) a maximum acceptable exposure relating to film overexposure latitude, and (2) a minimum acceptable exposure relating to film underexposure latitude; and
    c. digital electronic logic means for causing said indicating means to indicate whether the light regulating capability of said exposure control apparatus is adequate for said particular scene brightness to effect an exposure which is within a range bounded by said maximum acceptable exposure and said minimum acceptable exposure.

6. In a camera having means for sensing the brightness of a scene, means for setting an exposure control mechanism, and means for indicating the suitability of the exposure control setting to effect a proper film exposure, the improvement comprising:
    a. means settable in accordance with film exposure latitude including overexposure latitude and underexposure latitude;
    b. programmable electronic computer means, coupled to (a) said scene brightness sensing means, (b) said exposure latitude settable means, and (c) said exposure control mechanism setting means, and having a stored program for producing in accordance with said stored program (i) signals representing a range of acceptable film exposure values for a particular scene brightness as a function of input derived from said scene brightness sensing means and input from said exposure latitude settable means, said range being bounded by a minimum related to said underexposure latitude and a maximum related to said overexposure latitude, (ii) a signal representing an anticipated exposure value as a function of input derived from said exposure control mechanism setting means, and (iii) a control signal relating to whether said anticipated exposure value is within said range of acceptable film exposure values; and c. means responsive to said control signal for controlling said indicating means to indicate the appropriateness of the exposure control mechanism setting for providing an exposure which is within said film exposure latitude for said particular scene brightness.

7. In a photographic camera having means for sensing the brightness of a scene, means for setting an exposure control mechanism for regulating the amount of light reflected from a scene that impinges on a photographic film, said exposure control mechanism including means for manually setting at least one of (a) the size of a lens aperture, and (b) exposure duration, and means for indicating the suitability of the exposure control setting to effect a proper film exposure for a particular scene brightness, the improvement comprising:

a. settable means for providing data relating to film light sensitivity and film exposure latitude including overexposure latitude and underexposure latitude;

b. digital programmable computer means coupled to (a) said brightness sensing means, (b) said settable means, and (c) said exposure control mechanism setting means, having a stored program for producing in accordance with said stored program (i) a signal representing a first exposure value as a function of input from said settable means and input derived from said brightness sensing means, said first exposure value being functionally related to scene brightness and film light sensitivity, (ii) signals representing a range of acceptable film exposure values for a particular scene brightness as a function of said signal representing said first exposure value and input from said settable means, said range being bounded by an upper acceptable film exposure value related to said overexposure latitude and a lower acceptable film exposure value related to said underexposure latitude, (iii) a signal representing an anticipated exposure value as a function of input derived from said exposure control mechanism setting means, said anticipated exposure value being based upon a particular lens aperture size and exposure duration combination established by said exposure control mechanism setting means, and (iv) a control signal relating to whether said anticipated exposure value is within said range of acceptable film exposure values; and c. means responsive to said control signal for controlling said indicating means to indicate the appropriateness for effecting a proper film exposure of said particular lens aperture size and exposure duration combination.

* * * * *

UNITED STATES PATENT OFFICE
CERTIFICATE OF CORRECTION

PATENT NO. : 4,309,089
DATED : January 5, 1982
INVENTOR(S) : Donald M. Harvey

It is certified that error appears in the above-identified patent and that said Letters Patent are hereby corrected as shown below:

Col 2, Line 21  delete "these" and substitute therefor --there--

Col. 11, Line 51  delete "over-exposure" and substitute therefor --overexposure--

Col. 12, Line 63  Before "programmable" insert --digital--

Signed and Sealed this

Twenty-fourth Day of August 1982

[SEAL]

Attest:

GERALD J. MOSSINGHOFF

Attesting Officer     Commissioner of Patents and Trademarks